United States Patent
Rashidi et al.

(10) Patent No.: US 11,484,838 B2
(45) Date of Patent: Nov. 1, 2022

(54) BLACK LIQUOR CONCENTRATION BY A MEMBRANE COMPRISING GRAPHENE OXIDE ON POROUS POLYMER

(71) Applicant: Georgia Tech Research Corporation, Atlanta, GA (US)

(72) Inventors: Fereshteh Rashidi, Atlanta, GA (US); Sankar Nair, Atlanta, GA (US); Nikita Kevlich, Atlanta, GA (US); Meisha Shofner, Atlanta, GA (US); Scott Sinquefield, Atlanta, GA (US); Zhongzhen Wang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 16/941,963

(22) Filed: Jul. 29, 2020

(65) Prior Publication Data

US 2020/0368688 A1    Nov. 26, 2020

Related U.S. Application Data

(63) Continuation of application No. 15/702,536, filed on Sep. 12, 2017, now abandoned.

(Continued)

(51) Int. Cl.
*B01D 61/02* (2006.01)
*B01D 71/02* (2006.01)
(Continued)

(52) U.S. Cl.
CPC ......... *B01D 61/026* (2022.08); *B01D 61/025* (2013.01); *B01D 61/027* (2013.01);
(Continued)

(58) Field of Classification Search
CPC .... B01D 61/022; B01D 69/02; B01D 61/027; B01D 71/024; B01D 63/06; B01D 61/025;
(Continued)

(56) References Cited

U.S. PATENT DOCUMENTS

| 5,503,750 A | 4/1996 | Russo |
| 2006/0016751 A1 | 1/2006 | Ali |

(Continued)

FOREIGN PATENT DOCUMENTS

WO    2014/027197    2/2014

OTHER PUBLICATIONS

Luo, et al., "High Yield Preparation of Macroscopic Graphene Oxide Membranes," J. Am. Chem. Soc., 2009 vol. 131, pp. 8989-899.

(Continued)

*Primary Examiner* — Krishnan S Menon
(74) *Attorney, Agent, or Firm* — Troutman Pepper Hamilton Sanders LLP; Ryan A. Schneider

(57) ABSTRACT

The disclosed technology includes a membrane-based device configured to concentrate black liquor, which results from papermaking. Certain embodiments may comprise a nanofiltration membrane configured to remove lignin from black liquor, and the nanofiltration membrane may include a first macroporous polymer substrate and a first graphene oxide membrane covering the first macroporous polymer substrate. Some embodiments may comprise a reverse (Continued)

osmosis membrane, which may include a second macroporous polymer substrate and a second graphene oxide membrane covering the second macroporous polymer substrate.

24 Claims, 8 Drawing Sheets

Related U.S. Application Data

(60) Provisional application No. 62/393,226, filed on Sep. 12, 2016.

(51) Int. Cl.
| | | |
|---|---|---|
| *B01D 63/06* | (2006.01) | |
| *D21C 11/00* | (2006.01) | |
| *B01D 63/10* | (2006.01) | |
| *B01D 69/02* | (2006.01) | |
| *B01D 71/68* | (2006.01) | |
| *B01D 69/10* | (2006.01) | |

(52) U.S. Cl.
CPC ............. *B01D 63/06* (2013.01); *B01D 63/10* (2013.01); *B01D 69/02* (2013.01); *B01D 71/024* (2013.01); *D21C 11/00* (2013.01); *D21C 11/0042* (2013.01); *B01D 69/10* (2013.01); *B01D 71/68* (2013.01); *B01D 2325/04* (2013.01); *B01D 2325/22* (2013.01)

(58) Field of Classification Search
CPC ........ B01D 63/10; B01D 71/68; B01D 69/10; B01D 2325/22; B01D 2325/04; D21C 11/0042; D21C 11/00
See application file for complete search history.

(56) References Cited

U.S. PATENT DOCUMENTS

| | | |
|---|---|---|
| 2013/0270188 A1 | 10/2013 | Karnik et al. |
| 2013/0284665 A1 | 10/2013 | Lee et al. |
| 2015/0224449 A1* | 8/2015 | Kuo ..................... B01D 61/022 |
| | | 210/636 |
| 2017/0015692 A1* | 1/2017 | Samec .................. B01D 61/58 |
| 2017/0144107 A1* | 5/2017 | Garaj ..................... B01D 69/10 |
| 2017/0341034 A1* | 11/2017 | Dave ...................... B32B 27/285 |

OTHER PUBLICATIONS

Huang, et al., "Graphene-Based Membranes for Molecular Separation," The Journal of Physical Chemistry Letter, 2015, vol. 6, pp. 2806-2815.

Hu and Mi, "Enabling Graphene Oxide Nanosheets as Water Separation Membranes," Environmental Science & Technology, 2013 American Chemical Society, vol. 47, pp. 3715-3723.

* cited by examiner

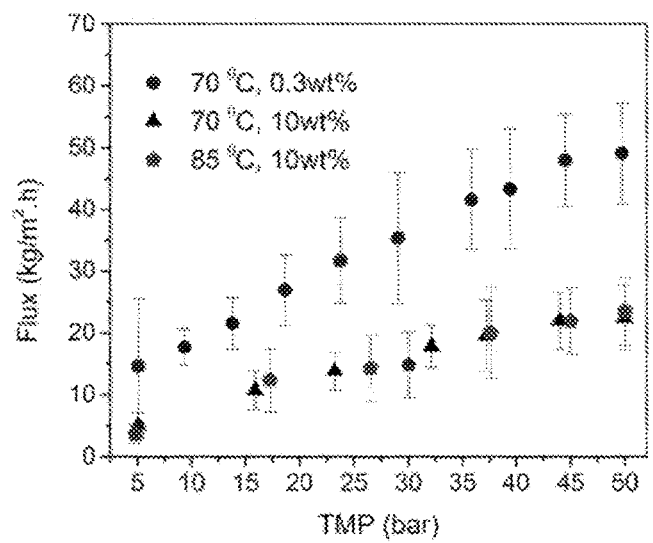
*Fig. 3*
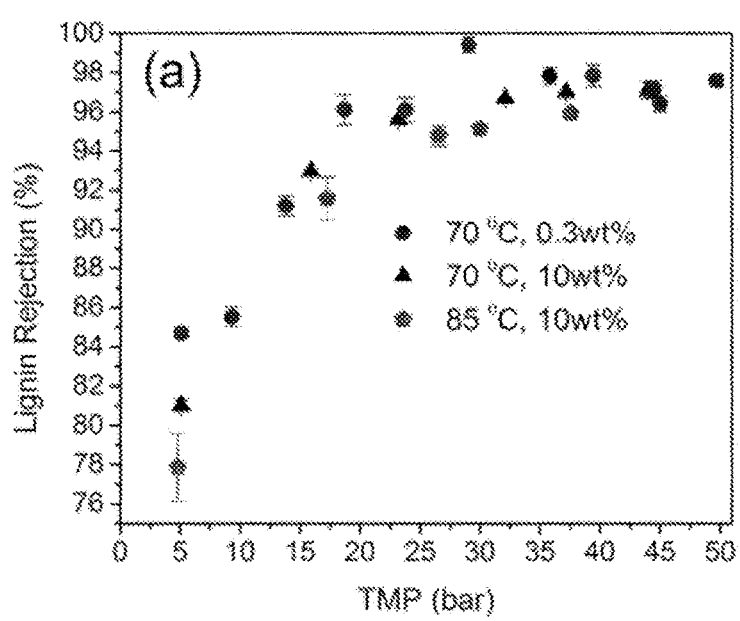
*Fig. 4A*
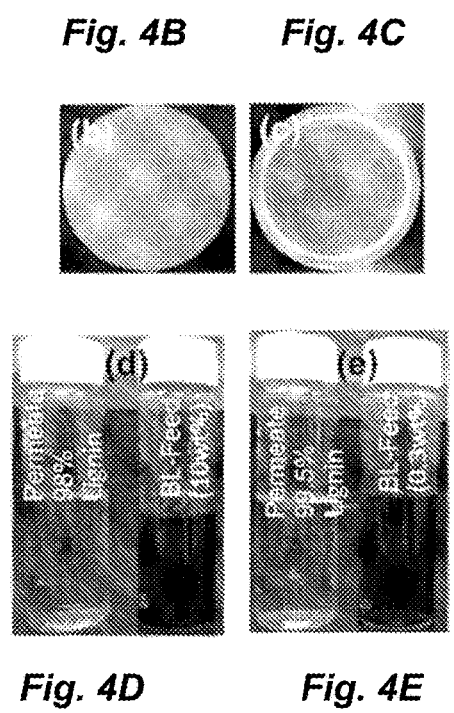
*Fig. 4B*  *Fig. 4C*
*Fig. 4D*  *Fig. 4E*

BLACK LIQUOR CONCENTRATION BY A MEMBRANE COMPRISING GRAPHENE OXIDE ON POROUS POLYMER

CROSS-REFERENCE TO RELATED APPLICATION

This application is a continuation of U.S. patent application Ser. No. 15/702,536, filed on Sep. 12, 2017, which claims the benefit, under 35 U.S.C. § 119(e), of U.S. Provisional Patent Application No. 62/393,226, filed 12 Sep. 2016, entitled "Black Liquor Concentration by a Membrane Comprising Graphene Oxide on Porous Polymer," the entire contents and substance of which are incorporated herein by reference in their entireties as if fully set forth below.

BACKGROUND

Black liquor is an aqueous waste product of the kraft papermaking process. A typical papermaking facility produces about 500 gal/min of weak black liquor (WBL), which generally comprises about 15 wt % of solids. The solids typically include lignin, hemicellulose, and inorganic chemicals suspended or dissolved in water, and the WBL solution typically has a pH of about 13 and is typically discharged having a temperature of about 70° C. to about 95° C. Conventionally, WBL is concentrated to strong black liquor (SBL), which generally comprises about 65 wt % to about 80 wt % of solids, via six-stage multiple-effect evaporators, and the SBL can be burned in a recovery boiler to produce energy.

The concentration process can be highly energy-intensive. The amount of energy required by this process may be reduced by introducing a separating process to the WBL, such as a membrane-based separation. Existing membranes, however, typically have a short working life due to the extreme alkaline pH and temperature typical of black liquor streams, are prohibitively expensive, and/or are unable to operate at a sufficient flux or sufficient efficiency of lignin rejection for industrial application. For example, polymer membranes generally have short lifetimes, are subject to fouling, and are expensive. Also, ceramic membranes, which may provide greater resilience than polymer membranes, are generally prohibitively expensive.

Therefore, there is a need for a membrane that can withstand a high-temperature and extremely alkaline environment and can resist fouling. There is also a need for a membrane that can be inexpensively manufactured such that industrial application is feasible. Further, there is a need for a membrane capable of removing or rejecting high percentages of a target material while simultaneously being capable of high flux or black liquor throughput such that industrial application is feasible.

SUMMARY

Aspects of the present disclosure provide a membrane system for concentrating black liquor. According to some embodiments, a membrane system can comprise a nanofiltration membrane that can be configured to remove lignin from black liquor. The nanofiltration membrane can comprise a first macroporous polymer substrate and a first graphene oxide membrane covering the first macroporous polymer substrate.

In some embodiments, the first macroporous polymer substrate can comprise a polymer with aryl groups.

In some embodiments, the first macroporous polymer substrate can comprise at least one of poly(sulfone) and poly(ethersulfone).

In some embodiments, the first macroporous polymer substrate can have a thermal stability limit greater than about 70° C.

In some embodiments, the first graphene oxide membrane can have a thickness of less than about 300 nm.

In some embodiments, the first microporous polymer substrate can comprise a flat polymer sheet, and the flat polymer sheet can have a surface area greater than or equal to about 700 $cm^2$.

In some embodiments, the first macroporous polymer substrate can comprise a plurality of the flat polymer sheets rolled around a core tube to form a spiral wound membrane module.

In some embodiments, the first microporous polymer substrate can comprise a hollow polymer tube, and the hollow polymer tube can have a surface area greater than or equal to about 100 $cm^2$.

In some embodiments, the first macroporous polymer substrate can comprise a plurality of the hollow polymer tubes, and the plurality of the hollow tubes can be combined to form a tubular membrane module.

In some embodiments, the first graphene oxide membrane can comprise pores in the range of about 3 angstroms to about 10 angstroms.

In some embodiments, the nanofiltration membrane can have a molecular weight cutoff in the range of about 300 Daltons to about 1000 Daltons.

In some embodiments, membrane system can further comprise a reverse osmosis membrane that can be configured to remove pulping chemicals from black liquor. The reverse osmosis membrane can comprise a second macroporous polymer substrate and a second graphene oxide membrane covering the second macroporous polymer substrate.

In some embodiments, the second macroporous polymer substrate can comprise a polymer with aryl groups.

In some embodiments, the second macroporous polymer substrate can comprise at least one of poly(sulfone) and poly(ethersulfone).

In some embodiments, the nanofiltration membrane can have a first molecular weight cutoff and the reverse osmosis membrane can have a second molecular weight cutoff, and in some embodiments, the second molecular weight cutoff can be less than the first molecular weight cutoff.

In some embodiments, the reverse osmosis membrane can have a molecular weight cutoff in the range of about 50 Daltons to about 300 Daltons.

According to some embodiments, a method is provided in which black liquor can be flowed through a membrane system. The black liquor can comprise lignin, and the membrane system can include a nanofiltration membrane that can comprise a first macroporous polymer substrate and a first graphene oxide membrane covering the first macroporous polymer substrate.

In some embodiments, the nanofiltration membrane can be configured to remove at least a portion of the lignin from the black liquor.

In some embodiments, the membrane system can further include a reverse osmosis membrane. The reverse osmosis membrane can comprise a second macroporous polymer substrate and a second graphene oxide membrane covering the second macroporous polymer substrate, and the reverse osmosis membrane can have a molecular weight cutoff less than a molecular weight cutoff of the nanofiltration membrane.

In some embodiments, the black liquor further can comprise pulping chemicals, and the reverse osmosis membrane can be configured to remove at least a portion of the pulping chemicals from the black liquor.

As noted above, the first macroporous polymer substrate can have a thermal stability limit greater than about 70° C. The first graphene oxide membrane can have a thickness of less than about 300 nm. The first microporous polymer substrate can comprises a flat polymer sheet, the flat polymer sheet having a surface area greater than or equal to about 700 cm². The first macroporous polymer substrate can comprise a plurality of the flat polymer sheets rolled around a core tube to form a spiral wound membrane module. The first microporous polymer substrate can comprise a hollow polymer tube, the hollow polymer tube having a surface area greater than or equal to about 100 cm². The first macroporous polymer substrate can comprises a plurality of the hollow polymer tubes combined to form a tubular membrane module.

In another exemplary embodiment, the present invention is a method for processing black liquor comprising flowing black liquor comprising lignin through a filtering membrane, the filtering membrane comprising a substrate and stacked graphene oxide layers forming a graphene oxide membrane covering the substrate, and removing at least a portion of the lignin from the black liquor via the filtering membrane, wherein permeability of the filtering membrane as measured by water permeation flux as a function of transmembrane pressure does not decrease after flowing the black liquor through the filtering membrane.

The at least of portion of the lignin removed from the black liquor can be at least 90% of the lignin present in the black liquor. The at least a portion of the lignin removed from the black liquor can be between 90% and 99% of the lignin present in the black liquor.

The substrate can be a microporous polymer substrate comprising a polymer with aryl groups. The substrate can be a macroporous polymer substrate comprising at least one of poly(sulfone) and poly(ethersulfone).

The graphene oxide membrane can have a thickness of less than about 300 nm.

The substrate can be a microporous polymer substrate comprising a flat polymer sheet having a surface area greater than or equal to about 700 cm². The substrate can be a macroporous polymer substrate comprising flat polymer sheets, wherein each polymer sheet has a surface area greater than or equal to about 700 cm², and wherein the polymer sheets are rolled around a core tube to form a spiral wound membrane module. The substrate can be a microporous polymer substrate comprising a hollow polymer tube having a surface area greater than or equal to about 100 cm². The substrate can be a macroporous polymer substrate comprising hollow polymer tubes, wherein each polymer tube has a surface area greater than or equal to about 100 cm², and wherein the polymer tubes are combined to form a tubular membrane module.

The interlayer d-spacings of the stacked graphene oxide layers can be in the range of about 3 angstroms to about 10 angstroms.

The filtering membrane can have a molecular weight cutoff in the range of about 300 Daltons to about 1000 Daltons.

In another exemplary embodiment, the present invention is a method of processing black liquor comprising providing a filtering membrane comprising a substrate and stacked graphene oxide layers forming a graphene oxide membrane covering the substrate, providing an input stream of black liquor to the filtering membrane, the black liquor comprising lignin, and filtering, via the filtering membrane, at least a portion of the lignin from the black liquor, wherein permeability of the filtering membrane as measured by water permeation flux as a function of transmembrane pressure does not decrease after filtering, via the filtering membrane, the at least a portion of the lignin from the black liquor.

The at least of portion of the lignin removed from the black liquor can be at least 90% of the lignin present in the black liquor. The at least a portion of the lignin removed from the black liquor can be between 90% and 99% of the lignin present in the black liquor.

The substrate can be a microporous polymer substrate comprising a polymer with aryl groups. The substrate can be a macroporous polymer substrate comprising at least one of poly(sulfone) and poly(ethersulfone).

The graphene oxide membrane can have a thickness of less than about 300 nm.

The substrate can be a microporous polymer substrate comprising a flat polymer sheet having a surface area greater than or equal to about 700 cm². The substrate can be a macroporous polymer substrate comprising flat polymer sheets, wherein each polymer sheet has a surface area greater than or equal to about 700 cm², and wherein the polymer sheets are rolled around a core tube to form a spiral wound membrane module. The substrate can be a microporous polymer substrate comprising a hollow polymer tube having a surface area greater than or equal to about 100 cm². The substrate can be a macroporous polymer substrate comprising hollow polymer tubes, wherein each polymer tube has a surface area greater than or equal to about 100 cm², and wherein the polymer tubes are combined to form a tubular membrane module.

The interlayer d-spacings of the stacked graphene oxide layers can be in the range of about 3 angstroms to about 10 angstroms.

The filtering membrane can have a molecular weight cutoff in the range of about 300 Daltons to about 1000 Daltons.

According to some embodiments, a method for manufacturing is provided. The method can comprise dispersing graphene oxide powder into water, separating exfoliated graphene oxide laminates of the graphene oxide powder from unexfoliated graphene oxide laminates of the graphene oxide powder, depositing the exfoliated graphene oxide laminates on a polymer substrate, and drying the exfoliated graphene oxide laminates.

BRIEF DESCRIPTION OF THE DRAWINGS

Reference will now be made to the accompanying figures, which are not necessarily drawn to scale, and wherein:

FIG. 3 is a graph indicating permeate flux through graphene oxide membranes as a function of applied pressure (TMP) during black liquor concentration under different operating conditions, in accordance with an example embodiment of the presently disclosed subject matter.

FIG. 4a is a graph indicating lignin rejection as a function of applied pressure (TMP) during black liquor concentration under different operating conditions, in in accordance with an example embodiment of the presently disclosed subject matter.

FIG. 4b is a photograph of a graphene membrane before exposure to black liquor, in accordance with an example embodiment of the presently disclosed subject matter.

FIG. 4c is a photograph of a graphene membrane after exposure to black liquor for an operational time of 96 h, in accordance with an example embodiment of the presently disclosed subject matter.

FIG. 4d is a photograph of samples of 10 wt % black liquor and collected permeate, in accordance with an example embodiment of the presently disclosed subject matter.

FIG. 4e is a photograph of samples of 0.3 wt % black liquor and collected permeate, in accordance with an example embodiment of the presently disclosed subject matter.

DETAILED DESCRIPTION

Figure 1:
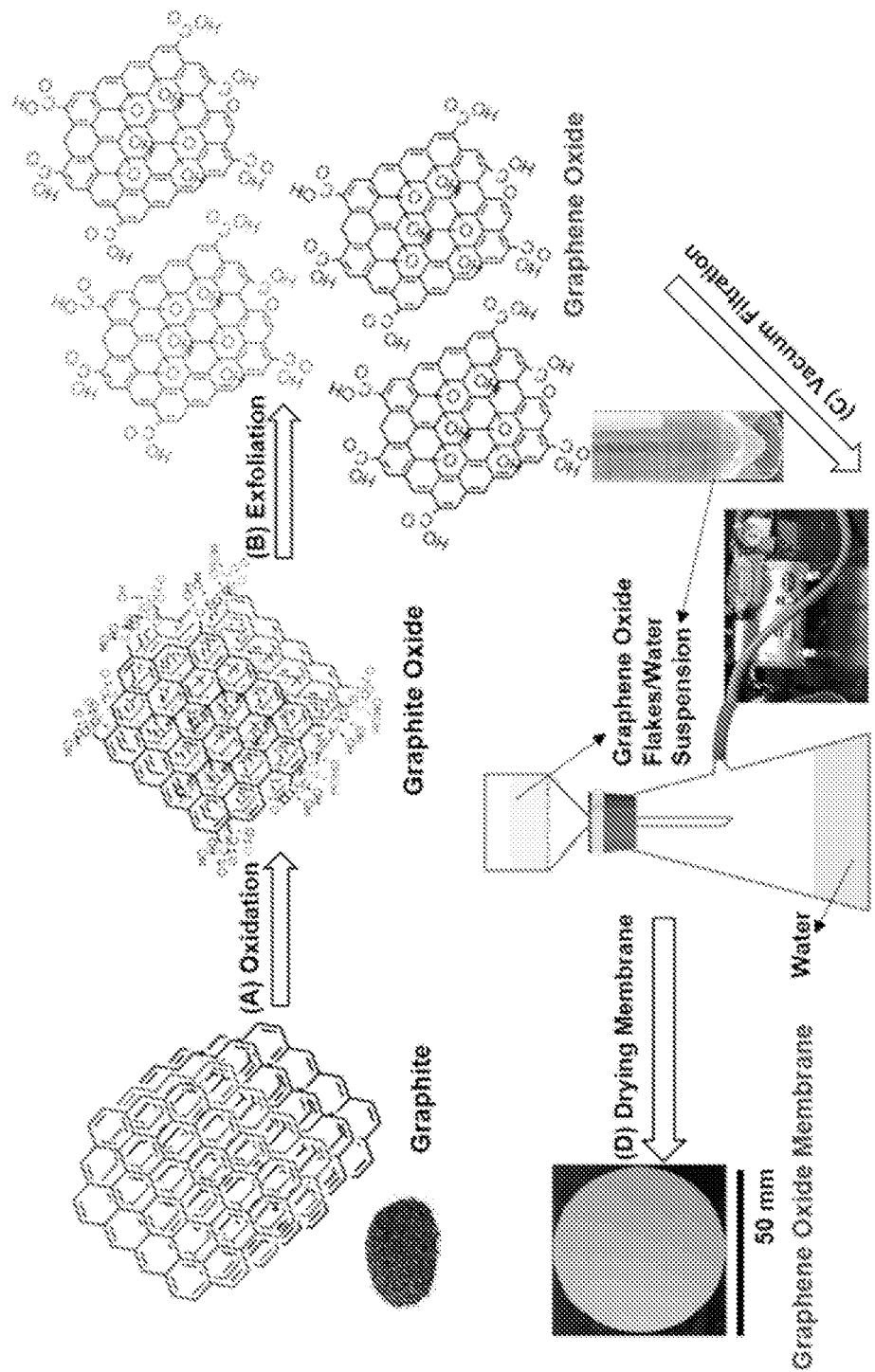
FIG. 1 is a schematic diagram illustrating the for fabricating a graphene oxide membrane, in accordance with an example embodiment of the presently disclosed subject matter.

The present disclosure can be understood more readily by reference to the following detailed description of exemplary embodiments and the examples included herein. Before the exemplary embodiments of the devices and methods according to the present disclosure are disclosed and described, it is to be understood that embodiments are not limited to those described within this disclosure. Numerous modifications and variations therein will be apparent to those skilled in the art and remain within the scope of the disclosure. It is also to be understood that the terminology used herein is for the purpose of describing specific embodiments only and is not intended to be limiting. Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

To facilitate an understanding of the principles and features of the embodiments of the present disclosure, example embodiments are explained hereinafter with reference to their implementation in an illustrative embodiment. Such illustrative embodiments are not, however, intended to be limiting.

The materials described hereinafter as making up the various elements of the embodiments of the present disclosure are intended to be illustrative and not restrictive. Many suitable materials that would perform the same or a similar function as the materials described herein are intended to be embraced within the scope of the example embodiments. Such other materials not described herein can include, but are not limited to, materials that are developed after the time of the development of the disclosed technology, for example.

Embodiments of the disclosed technology include a membrane system configured to remove lignin from black liquor. In some embodiments, the membrane system may include a nanofiltration membrane. The nanofiltration membrane can, in some embodiments, comprise a macroporous polymer substrate and a graphene oxide membrane. In certain embodiments, the macroporous polymer substrate can comprise a flat polymer sheet and/or a hollow polymer tube. Because black liquor is typically discharged having a temperature in the range of about 70° C. to about 95° C., in some embodiments, the macroporous polymer substrate may be at least partially composed of a polymer having a thermal stability limit greater than the typical temperature of the black liquor. For example, certain embodiments may include a polymer having a thermal stability limit greater than about 70° C., some embodiments may include a polymer having a thermal stability limit greater than about 80° C., and some embodiments may include a polymer having a thermal stability limit greater than about 95° C. In certain embodiments, the polymer may have a thermal stability limit in the range of about 70° C. to about 150° C. In some embodiments, the polymer may have a thermal stability limit in the range of about 70° C. to about 95° C. It should be understood that this disclosure is not limited to only those polymers having thermal stability limits expressly recited herein and that any polymer having a thermal stability limit sufficient to withstand the thermal environment provided by the discharged black liquor is herein contemplated. In certain embodiments, the membrane system can have a flux of black liquor in the range of about 10 kg/m$^2$/h to about 30 kg/m$^2$/h. And in some embodiments, the membrane system can be resistant to high pH as well as resistance to fouling at transmembrane pressures of about 10 bar to about 35 bar.

In some embodiments, the macroporous polymer substrate may comprise one or more polymers with aryl groups. For example, some embodiments may include poly(sulfone) (PSF) or poly(ethersulfone) (PES). Certain embodiments may include a polymer with a relatively high hydrophilicity, which may result in higher water flux and may provide strong adhesion to the graphene oxide membrane.

According to some embodiments, partially oxidized graphene layers can be stacked to form a graphene oxide membrane. In some embodiments, the spacing between the graphene oxide layers (d-spacing) can be altered to control the effective pore size of the graphene oxide membrane, i.e., the median or mean size of the pores of the graphene oxide membrane, which dictates, based on the size of matter or objects, which matter or objects are permitted to pass through the graphene oxide membrane and which are retained or rejected by the graphene oxide membrane. In some embodiments, the graphene oxide membrane at least partially covers the macroporous polymer substrate. In some embodiments, the graphene oxide layers are comprised of graphene oxide flakes. The graphene oxide flakes can have a thickness of about 3 nm to about 10 nm. In some embodiments, the graphene oxide flakes can have a thickness of about 5 nm to about 6 nm. In some embodiments, the graphene oxide flakes have a lateral dimension of about 200 nm to about 1000 nm. In some embodiments, the graphene oxide flakes have a lateral dimension of about 200 nm to about 500 nm.

In some embodiments, the thickness of the graphene oxide membrane may be less than or equal to about 300 nm. In certain embodiments, the d-spacing of the graphene oxide membrane can be dimensioned such that the nanofiltration membrane is configured to remove or reject lignin from black liquor. For example, in some embodiments, the nanofiltration membrane may have a molecular weight cutoff from about 300 Daltons to about 500 Daltons. In some embodiments, the nanofiltration membrane may have a molecular weight cutoff from about 500 Daltons to about 1000 Daltons. (Molecular weight cutoff refers to lowest molecular weight of a solute in which 90% of the solute is retained by a membrane.) In certain embodiments, the graphene oxide membrane of the nanofiltration membrane may comprise pores in the range of about 3 angstroms to about 15 angstroms. In some embodiments, the graphene oxide membrane may comprise pores in the range of about 7 angstroms to about 10 angstroms. In some embodiments, the graphene oxide membrane may comprise pores in the range of about 3 angstroms to about 10 angstroms. Some embodiments may reject lignin at a rate greater than or equal to about 90%. For example, some embodiments may reject lignin at a rate of about 95% to about 99%.

According to some embodiments, the membrane system may comprise a reverse osmosis membrane that includes a macroporous polymer substrate and a graphene oxide membrane at least partially covering the macroporous polymer substrate. In certain embodiments, the macroporous polymer substrate may comprise at least one of the materials discussed above with respect to the macroporous polymer substrate of the nanofiltration membrane. In certain embodiments, the macroporous polymer substrate can comprise a flat polymer sheet and/or a hollow polymer tube. In some embodiments, the thickness of the graphene oxide membrane may be less than or equal to about 300 nm. According to some embodiments, the d-spacing of the graphene oxide membrane can be dimensioned such that the reverse osmosis membrane is configured to remove pulping chemicals from black liquor. For example, some embodiments may be configured to remove inorganic salts from black liquor. In certain embodiments, the reverse osmosis membrane may have a molecular weight cutoff in the range of about 50 Daltons to about 300 Daltons. In certain embodiments, the graphene oxide membrane of the reverse osmosis membrane may comprise pores less than approximately 1 nm. In some embodiments, the reverse osmosis membrane may be configured to remove or reject about 70% to about 95% of pulping chemicals from the black liquor.

In some embodiments, the flat polymer sheet of the nanofiltration membrane and/or the reverse osmosis membrane may have a surface area in the range of about 500 cm$^2$ to about 1000 cm$^2$. For example, in some embodiments, the flat polymer sheet may have a surface area of about 700 cm$^2$. In certain embodiments, the nanofiltration membrane and/or the reverse osmosis membrane may comprise a plurality of flat polymer sheets combined to form a spiral wound membrane module. For example, in some embodiments, a spiral wound membrane module can comprise a plurality of flat polymer sheets stacked atop one another, and the plurality of stacked flat polymer sheets may be rolled around a core tube. In some embodiments, prior to being rolled around the core tube, adjacent flat polymer sheets may be separated by a sheet of feed channel spacer to form a leaf, and each leaf may be separated by a sheet of permeate spacer. When the flat polymer sheets, the one or more feed channel spacers, and the one or more permeate spacers are rolled around the core tube, each permeate spacer may form a permeate channel. Thus, black liquor may be forced through the feed channel spacers, and water from the black liquor may pass through a flat polymer sheet (e.g., a nanofiltration membrane or a reverse osmosis membrane) into a permeate channel and may then flow in a spiral direction to the core tube.

In some embodiments, the nanofiltration membrane and/or the reverse osmosis membrane may comprise a plurality of hollow polymer tubes. In certain embodiments, the hollow polymer tubes may be combined to form a tubular membrane module. In some embodiments, the hollow polymer tubes are arranged in a parallel orientation within the tubular membrane module. In some embodiments, black liquor may be fed under pressure into each of the plurality of membrane tubes, and the pressure may force water from the black liquor through the membrane tubes while the targeted solute of the black liquor is restrained within the membrane tubes. In some embodiments, the water may then exit the tubular membrane module through a permeate tube, and in some embodiments, the targeted solute may exit the tubular membrane module through the hollow polymer tubes.

Some embodiments may include a nanofiltration membrane and/or a reverse osmosis membrane. Thus, some embodiments may be configured to remove lignin from black liquor, some embodiments may be configured to remove pulping chemicals from black liquor, and some embodiments may be configured to remove lignin and pulping chemicals from black liquor. In some embodiments, retentate product from the nanofiltration membrane (i.e., lignin) may be combined with retentate product from the reverse osmosis membrane (i.e., recovered pulping chemicals) to produce a concentrated black liquor that can then be introduced to the conventional evaporator train. In certain embodiments, the concentrated black liquor may be of sufficient concentrated that the first two stages of a conventional evaporator train may be skipped. In some embodiments, the concentrated black liquor may be about 25 wt % to about 35 wt %.

Some embodiments of the disclosed technology may be manufactured by treating raw graphite with an acid treatment to produce a graphene oxide powder. In certain embodiments, the graphene oxide powder may then be treated with base reflux. In other embodiments, the graphene oxide powder is not treated with base reflux. In some embodiments, the graphene oxide powder is dispersed into water. According to some embodiments, exfoliated graphene oxide laminates of the graphene oxide powder may be separated from unexfoliated graphene oxide laminates of the graphene oxide powder, and in some embodiments, the exfoliated graphene oxide laminates may be deposited on a polymer substrate. In some embodiments, the polymer substrate is a macroporous polymer substrate. In certain embodiments, the exfoliated graphene oxide laminates are then dried to provide a graphene oxide membrane. Drying the exfoliated graphene oxide laminates can include active drying (e.g., placing the polymer substrate into an oven) or passive drying (e.g., waiting for the water to evaporate). In some embodiments, the graphene oxide membrane may be modified. For example, in some embodiments, the graphene oxide membrane may be modified with organic reagents, such as amines, aldehydes, dialdehydes, thiols or other reagents capable of forming chemical or physical bonds with the graphene oxide membrane. This may, for example, provide crosslinking of the graphene oxide layers and may lead to covalent bonding between sheets, which may reduce d-spacing, and the d-spacing may be adjustable by using different reagents.

Examples

The below merely describes example embodiments, and the disclosed technology is not limited to these example embodiments.

Graphene oxide was synthesized from fine grade synthetic graphite laminates of <20 μm size, by a modification of the Hummers method. In the original Hummers method, per-oxidation of graphite was recommended to avoid the formation of incompletely oxidized graphite-core/graphene-oxide-shell particles. For this pretreatment, 3 g of graphite powder was added into 12 mL of 98% $H_2SO_4$ at 80° C. while stirring. Then 2.5 g $K_2S_2O_8$ and 2.5 g $P_2O_5$ were gradually added, and the mixture was maintained at 80° C. for 4 h under stirring. It was then cooled to room temperature, diluted with 500 mL DI water, filtered through a filter paper with pore size of 2 μm, washed with DI water to remove excess acid and oxidizing agents, and dried at room temperature. The pretreated graphite powder was added into 120 mL $H_2SO_4$ at 0° C. Then 15 g $KMnO_4$ and 250 mL DI water were then gradually added, with an ice bath being used to keep the temperature below 50° C. After stirring for 2 h, another 700 mL of DI water was added. In the final step, 20 mL of 30% $H_2O_2$ was added gradually until the mixture turned yellow due to reduction of $MnO_4^-$ to water-soluble $Mn^{2+}$. The mixture was then filtered through a filter paper with pore size of 2 μm, washed several times with DI water, then washed with 1 M aqueous HCl, and finally washed with DI water until the pH became neutral (7). The final graphene oxide powder was obtained after drying at room temperature for 24 h. FIG. 1 illustrates the main steps of the above procedure.

Macroporous PES films (purchased from Sterlitech) of thickness 140 μm, pore size of 0.2 μm, and porosity of 75% were used as supports for fabricating graphene oxide membranes. First, the graphene oxide powder was dispersed in DI water (2 mg graphene oxide per mL water) and sonicated for 2 h to exfoliate the graphene oxide laminates followed by centrifugation to remove unexfoliated graphene oxide. Then, graphene oxide membranes were deposited on the PES supports from the aqueous graphene oxide suspensions using a vacuum filtration method (see FIG. 1). The PES support was placed on a Millipore filter (90 mm diameter and 160-250 μm pore size) with the permeate side connected to a vacuum pump, and the graphene oxide suspension was permeated through the assembly by the vacuum driving force resulting in trapping and deposition of the exfoliated graphene oxide laminates on the PES support. The thickness of the graphene oxide membrane can be controlled by the volume and concentration of the graphene oxide suspension. The as-made graphene oxide membranes were dried at 50° C. for 24 h.

The interlayer spacing (d-spacing), morphology, thickness, and lateral dimensions of the graphene oxide laminates and membranes were characterized and determined by a combination of X-ray diffraction (XRD, PAnalytical)(Pert Pro with a CuKα source with 0.154 nm wavelength and operating in Bragg-Brentano geometry), scanning electron microscopy (SEM, Hitachi SU FESEM operated at 5 keV, 10 μA), atomic force microscopy (AFM, ICON Dimension scanning probe microscope Bruker, operated under tapping mode with Mikromasch NSC14 silicon cantilevers of 8 nm tip radius, 5 N m$^{-1}$ force constant, and 47-76 kHz resonance frequency), and dynamic mechanical analysis (DMA, Mettler Toledo DMA/SDTA861). For the DMA measurements, a thermal sweep was performed from 30° C. to 150° C. with 2° C./min heating rate, 1 Hz frequency and 1 μm amplitude. The amplitude was verified to be in the linear viscoelastic range of the sample at the low and high temperature limits used for the measurement. The porosity of the PES support was measured by a Micromeritics Autopore IV mercury porosimeter.

The membranes were cut into circular sections of 47 mm diameter with effective membrane area of 13.1 cm$^2$. A Sterlitech high-pressure dead-end stirred cell (HP4750X, 2500 psi maximum pressure rating) with an impeller assembly (mechanical Stirrer with SS 316 stir bar and shaft) was used for permeation measurements. A collection vessel placed on a digital mass balance (Ohaus Pioneer PA313) was used to collect the permeate liquid. The permeate mass, system temperature, and feed pressure were monitored and recorded digitally in real time on a computer via a LabVIEW interface. Nitrogen gas was used to pressurize the liquid on the feed side. After the membrane was mounted in the permeation cell, the feed side was filled with 300 mL of the feed liquid and the system was heated to the desired temperature (20, 70, or 85° C.) using heating tape (McMaster Carr Extreme-temperature heat cable with 10' Length, 520 W, 120 VAC with a plug). Both the heating tape and the thermocouples were connected to a temperature controller. In addition, the cell along with the heating tape was sealed with fiberglass to inhibit heat losses.

Upon equilibration of the temperature, the transmembrane pressure (TMP) in the range of 1-50 bar was created by applying nitrogen pressure to the feed side through a regulator. The permeation measurement at each TMP was conducted with a fresh feed liquid. Prior to conducting the measurements with black liquor, at least two pure water permeation runs were performed at 50 bar TMP and 20° C. to condition the membrane. The permeate flux at the given TMP was calculated from the steady state portion of the permeate mass-versus-time data. During the steady-state period, 3 mL of permeate was collected separately for composition measurements. Since measurements conducted at different temperatures at which there is significant variation in black liquor physical properties, we maintained the Reynolds number (Re) to be approximately constant since it has the greatest influence on external mass transfer effects. Literature correlations specifically developed for black liquor were used to estimate its viscosity and density at different concentrations and temperatures. The stirred-cell permeation module used in this study was $$Re = \rho d^2 N/\mu,$$

where $\rho$ is the solution density, $\mu$ is the viscosity, d is the impeller diameter (2.94 cm), and N is the impeller angular velocity (rps). For pure water permeation at 20° C., the impeller speed was 1.33 rps, and it was appropriately scaled for different feed viscosities and densities using the condition of constant Re (~6000).

The observed (apparent) rejection of lignin was determined using the equation $$R = (1 - C_p/C_f) \times 100\%,$$

where $C_p$ and $C_f$ denote the permeate and bulk feed concentrations, respectively. The concentrations of lignin in the feed and permeate were determined with an Agilent 8510 UV-vis absorption spectrophotometer, via the integrated intensity of the characteristic peak at 280 nm. To avoid lignin precipitation (which occurs at lower pH), all UV-vis dilutions and calibration solution were made in a pH 13 buffer (glycine/sodium hydroxide/sodium chloride solution, Sigma-Aldrich). A quartz cuvette was used for all measurements. This method was adopted because black liquor contains a complex mixture of inorganics, and a precise compositional analysis (by ICP-MS or ICP-OES) for all the permeate samples is time-consuming and prohibitively expensive. Since lignin macromolecules also carry charge and may influence the conductivity, these experiments were instead performed with a simulated (model) black liquor.

The molecular cutoff weight (MWCO) was determined as the molecular weight (MW) of a test dye molecule that has a rejection of 90%. This analysis was performed by measuring the rejection of several dye molecules with MWs in the range of 300-800 Da at 0.01 wt % dye concentration at room temperature over the same range of TMP used for black liquor concentration. The dyes used were Methyl Blue (800 Da, acidic), Congo Red (700 Da, basic), Amaranth (600 Da, acidic), Allura Red AC (500 Da, acidic), and Toluidine Blue O (300 Da, basic). Between all measurements, the membranes were cleaned with 1 N HCl solution after exposure to basic dyes and with 1 N NaOH solution after exposure to acidic dyes while stirring for 30 min at room temperature.

The total solids were determined by established standard protocols, specifically the TAPPI method T650. To determine inorganic content, a black liquor sample was heated at 105° C. for at least 6 h to evaporate the water. The TAPPI method T625 was then used to remove the organic content by high-temperature (800-1000° C.) combustion and determine the inorganic content (as sulfated ash). The total organic content is the total solids minus the inorganic content. Of the total organic content, the lignin concentration of a black liquor sample was determined by UV-vis spectrophotometric measurement at 280 nm, pH>13 using a 23.7 L g$^{-1}$ cm$^{-1}$ extinction coefficient and 1 cm path length.

Figure 2A:
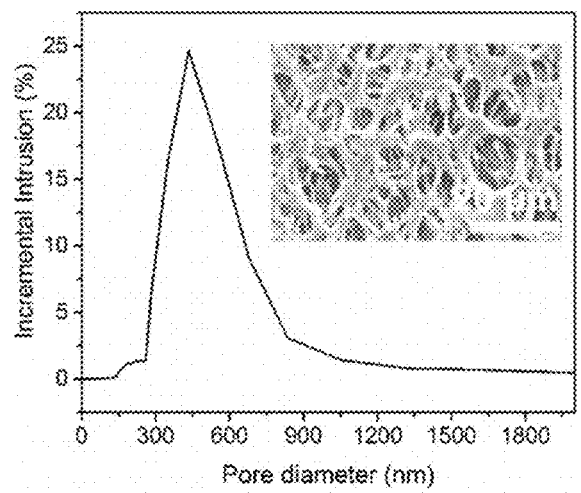
FIG. 2a is a graph indicating pore size distribution of a poly(ethersulfone) polymer substrate, in accordance with an example embodiment of the presently disclosed subject matter.
Figure 2B:
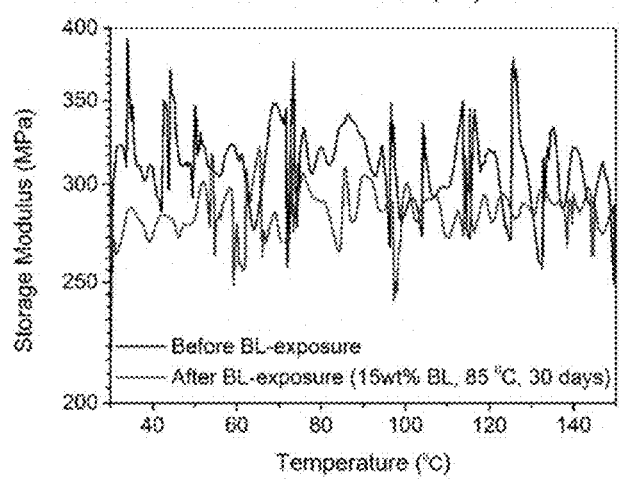
FIG. 2b is a graph indicating the results of dynamic mechanical analysis performed on a poly(ethersulfone) polymer substrate before and after immersion in black liquor for an extended period, in accordance with an example embodiment of the presently disclosed subject matter.
Figure 2C:
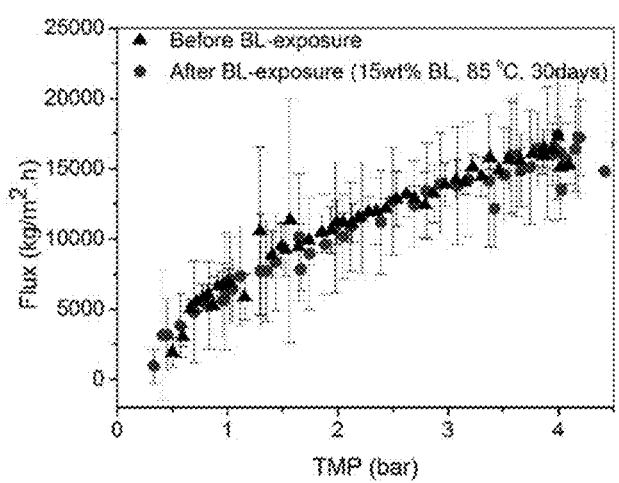
FIG. 2c is a graph indicating water permeation of a poly(ethersulfone) polymer substrate before and after immersion in black liquor for an extended period, in accordance with an example embodiment of the presently disclosed subject matter.

FIGS. 2a-2c summarize the measured properties of macroporous PES support films. The porosity was measured by mercury porosimetry, and shows an average pore size of ~500 nm with ~75% porosity (see FIG. 2a). The thermomechanical stability in the temperature range of 25-150° C. was determined by dynamic mechanical analysis (DMA) on PES support samples before and after immersion in black liquor for 30 days at 85° C. FIG. 2b shows that the PES support is thermomechanically stable, showing approximately constant storage modulus in the range of 30-150° C. In addition, chemical stability of the PES support was investigated by immersing it in 15 wt % stock black liquor at 85° C. continuously for 30 days. Afterward, the support was cleaned with a 1 M NaOH solution. The pure water flux of pristine and black liquor-immersed PES supports is shown in FIG. 2c. It is seen that the permeation properties of the PES support are unaffected by black liquor exposure at higher temperatures. Similar measurements with PP and PVDF supports showed severe degradation upon black liquor exposure. As a result, we selected macroporous PES supports for the fabrication of graphene oxide membranes in this study.

FIG. 3 shows the permeate flux versus TMP through graphene oxide membranes at 70° C. and 85° C. using black liquor feeds with 0.3 wt % and 10 wt % total solids. Graphene oxide membranes allow high permeate fluxes (in the range of 20-50 kg m$^{-2}$ h$^{-1}$ at 35-50 bar TMP) comparable to the best commercial membranes evaluated in the literature. The maximum surface fluid velocity (defined as the product of the impeller angular velocity and the impeller radius) is in the range of 0.22-0.31 m/s, which is characteristic of the stirred-cell permeation apparatus used in this study. With the use of crossflow type modules that can achieve higher surface velocities, one may expect even higher fluxes.

Operation with real black liquor leads to a significantly lower flux than with a diluted (0.3 wt % total solids) black liquor, due to the additional concentration polarization ("fouling") resistance created by the solids at the membrane surface. The chemical and physical properties of the membrane (pore size, pore morphology, and hydrophilicity/hydrophobicity) affect the fouling/concentration polarization behavior. The present graphene oxide membranes surprisingly show an approximately linear increase in flux up to high TMP values. Without wishing to be bound by theory, it is thought that the hydrophilic surface of graphene oxide may reduce interactions with relatively hydrophobic species such as lignin. FIG. 3 shows that the temperature change from 70° C. to 85° C. does not have a significant effect on the flux, and that the graphene oxide membranes continue to operate with a high flux.

Figure 5:
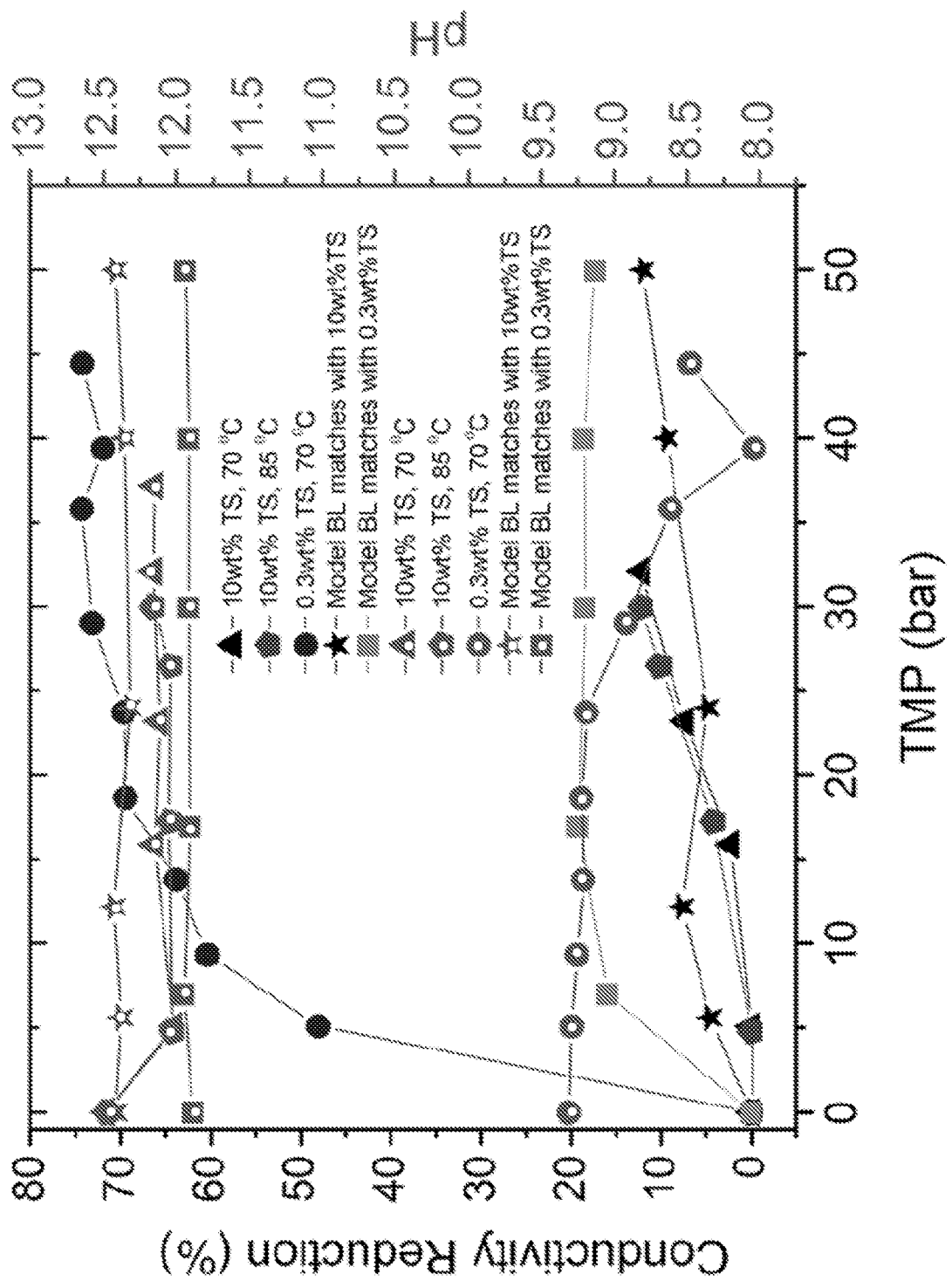
FIG. 5 is a graph indicating conductivity reduction as a function of applied pressure (TMP) during black liquor concentration with graphene oxide membranes under different operating conditions and a model simulated black liquor feed containing only inorganic solids, as well as the corresponding pH of the permeating (corresponding to the right-hand axis and the symbols having holes), in accordance with an example embodiment of the presently disclosed subject matter.
Figure 6:
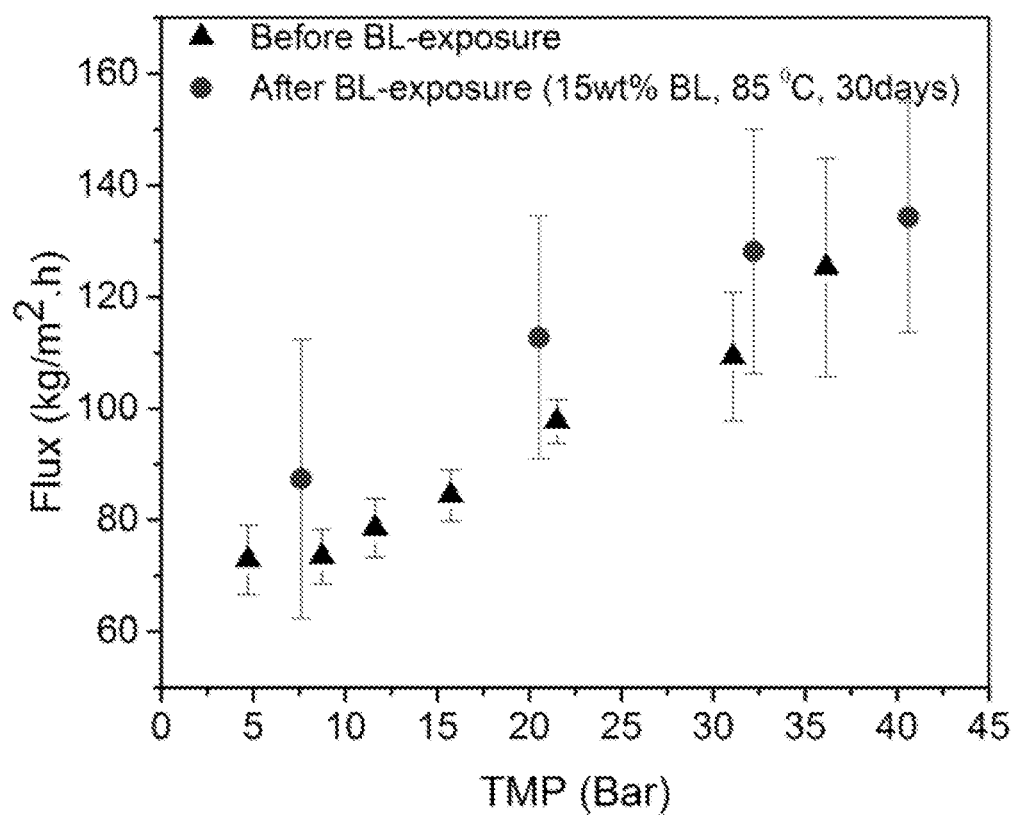
FIG. 6 is a graph indicating water flux of a graphene oxide membrane before and after immersion in black liquor for an extended period, in accordance with an example embodiment of the presently disclosed subject matter.

FIG. 4a shows the lignin rejection properties of the graphene oxide membranes. Under all operating conditions investigated, including the most realistic conditions of 85° C. and 10 wt % total solids, the lignin rejection stabilizes at TMPs of 25-30 bar and reaches high values in the 95-98% range. FIG. 4d shows photographs of the 10 wt % total solids black liquor feed and the clarified permeate liquid obtained at a TMP of 35 bar and operating temperature of 70° C. Also, we estimated the inorganic reduction properties of these graphene oxide membranes. FIG. 5 shows the conductivity reduction of the graphene oxide membranes using both stock black liquor feeds with 0.3 and 10 wt % total solids as well as a model (simulated) black liquor feed containing only inorganic solids (3.2 wt %). The conductivity reduction properties are strongly dependent on the feed solids concentration and TMP. The conductivity reduction reaches 75% for the diluted 0.3 wt % black liquor feed whereas it is much lower (~20%) at high solids concentrations for both the real and simulated black liquor feeds. The pure water flux of pristine and black liquor-immersed graphene oxide membrane is shown in FIG. 6. It is seen that the permeation properties of the graphene oxide membranes are unaffected by black liquor exposure at higher temperatures.

The permeation data in FIGS. 3 and 4a were collected by using fresh black liquor feed for each data point at a different TMP. The membrane continued to permeate liquid with no sign of degradation or severe concentration polarization after several days of total solids black liquor feed and TMPs up to 50 bar. This shows that membrane performance is likely to be maintained for industrial black liquor feeds which have somewhat higher solids concentration (15-18 wt % total solids) than the 10 wt % total solids black liquor used herein.

Figure 7A:
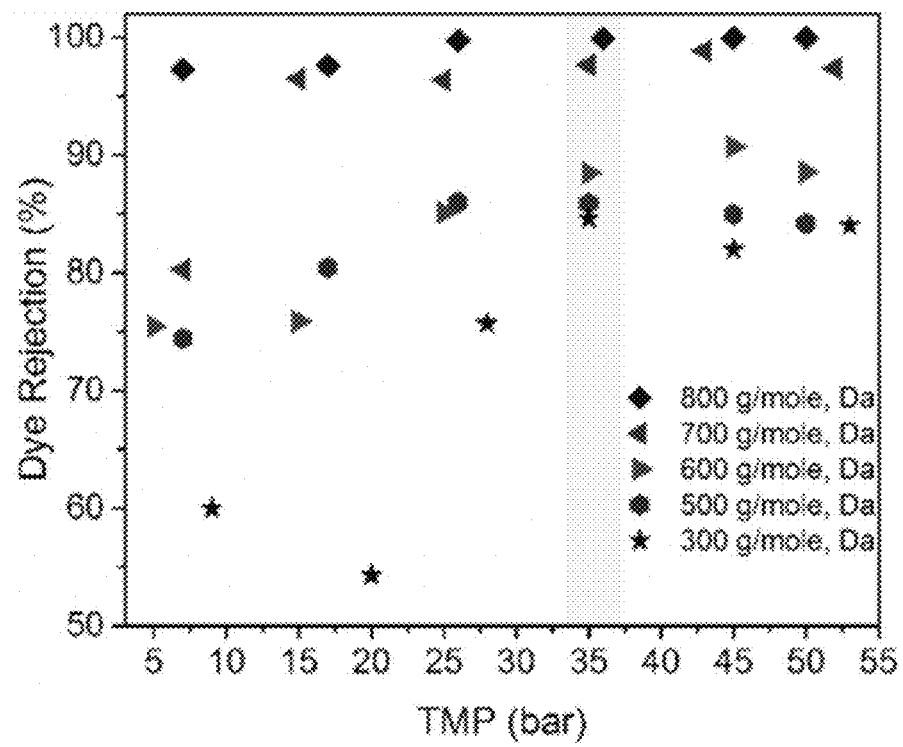
FIG. 7a is a graph indicating dye rejection by a graphene oxide membrane as a function of applied pressure (TMP) for different dyes, in accordance with an example embodiment of the presently disclosed subject matter.
Figure 7B:
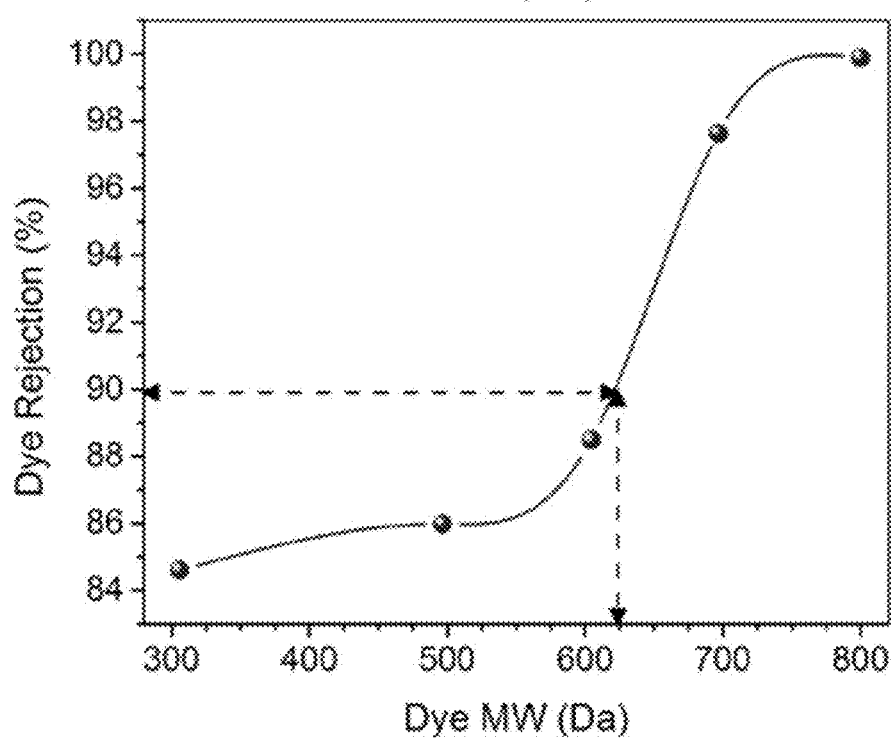
FIG. 7b is a graph indicating dye rejection by a graphene oxide membrane as a function of dye molecular weight at an applied pressure (TMP) of 35 bar, in accordance with an example embodiment of the presently disclosed subject matter.

FIGS. 7a and 7b shows the determination of the molecular weight cutoff (MWCO) for the graphene oxide membranes. The rejection of five dye molecules-Methyl Blue (800 Da, acidic), Congo Red (700 Da, basic), Amaranth (600 Da, acidic), Allura Red AC (500 Da, acidic), Toluidine Blue O (300 Da, basic)—with different MWs in the range of 300-800 Da was determined at room temperature and under the same TMPs used for black liquor concentration. FIG. 7a shows that the rejections stabilize at TMPs around 35 bar, similar to the lignin rejection behavior. Therefore, the rejections at 35 bar were used for MWCO determination. Based upon FIG. 7b, the graphene oxide membranes reached 90% rejection at an MW of about 625 Da. The membranes reached nearly 100% rejection at 800 Da.

Figure 8A:
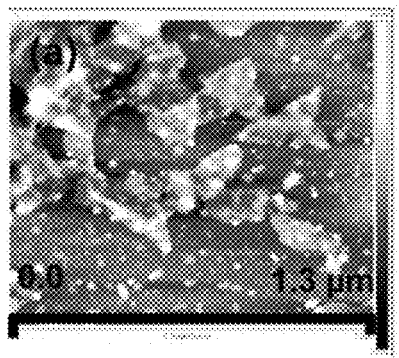
FIG. 8a is an image showing the lateral dimensions of a graphene oxide membrane, in accordance with an example embodiment of the presently disclosed subject matter.
Figure 8B:
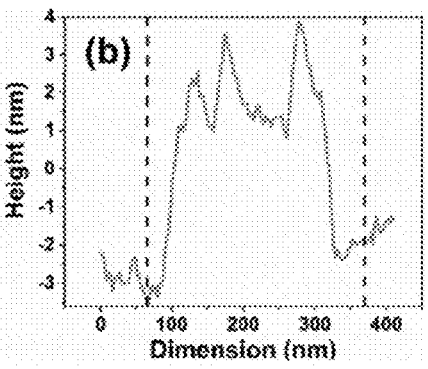
FIG. 8b is a graph indicating a height trace of a graphene oxide membrane that shows out-of-plane dimensions, in accordance with an example embodiment of the presently disclosed subject matter.
Figure 8C:
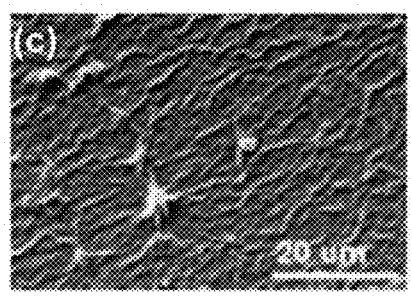
FIGS. 8c-8e are top surface and cross-section SEM views of a graphene oxide membrane supported by a poly(ethersulfone) substrate before immersion in black liquor, in accordance with an example embodiment of the presently disclosed subject matter.
Figure 8F:
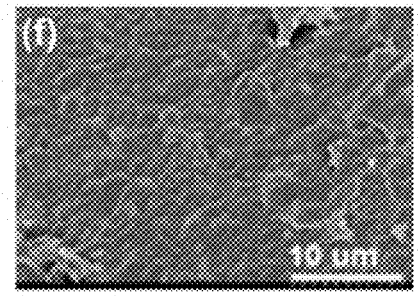
FIGS. 8f-8h are top surface and cross-section SEM views of a graphene oxide membrane supported by a poly(ethersulfone) substrate after immersion in black liquor, in accordance with an example embodiment of the presently disclosed subject matter.
Figure 8D:
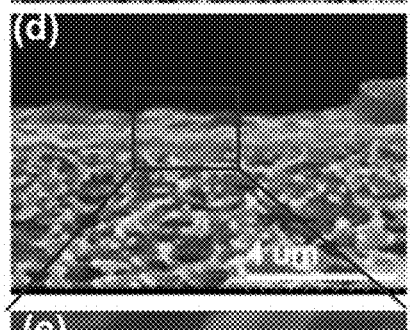
Figure 8G:
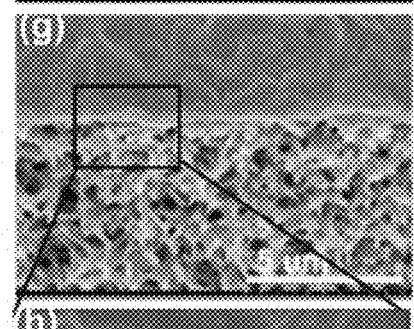
Figure 8E:
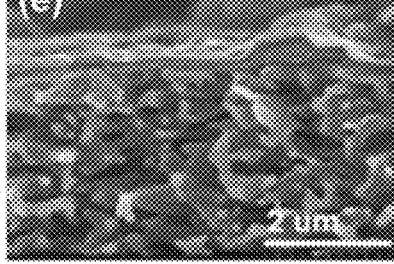
Figure 8H:
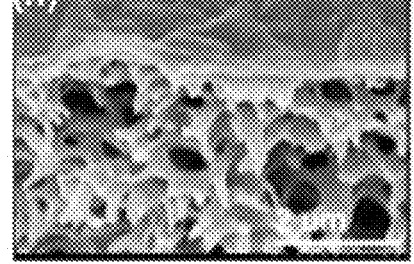

FIGS. 8a and 8b show an AFM image of dispersed graphene oxide laminates obtained from an aqueous suspension and the height trace of the out-of-plane dimension. The graphene oxide laminates are 200-1000 nm in lateral dimensions and 5-6 nm in thickness. FIGS. 8c-8e show top surface and cross-section SEM views of the PES-supported graphene oxide membrane in pristine (as-made) form. graphene oxide FIGS. 8f-8h show corresponding SEM images of the graphene oxide membrane after about 4 days of use in black liquor concentration experiments with 10 wt % total solids black liquor at 70° C. The membrane was not cleaned after use. The visual appearance of the membrane surface is not significantly different from that of the pristine membrane and maintains the thin, uniform, and continuous graphene oxide layer without any visible degradation. The PES support also did not show any significant visible degradation.

Figure 9A:
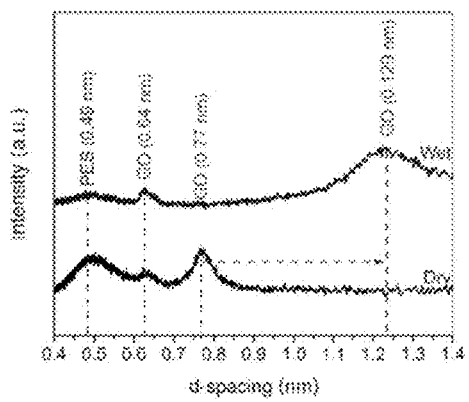
FIG. 9a is a graph indicating the XRD patterns of a graphene oxide membrane supported by a poly(ethersulfone) substrate before exposure to black liquor and when the graphene oxide membrane was wet and dry, in accordance with an example embodiment of the presently disclosed subject matter.
Figure 9B:
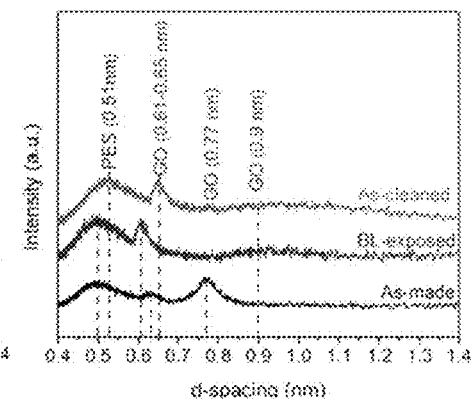
FIG. 9b is a graph indicating the XRD patterns of a graphene oxide membrane supported by a poly(ethersulfone) substrate when the graphene oxide membrane was exposed to 0.3 wt % black liquor at 20° C. for 3 days, in accordance with an example embodiment of the presently disclosed subject matter.
Figure 9C:
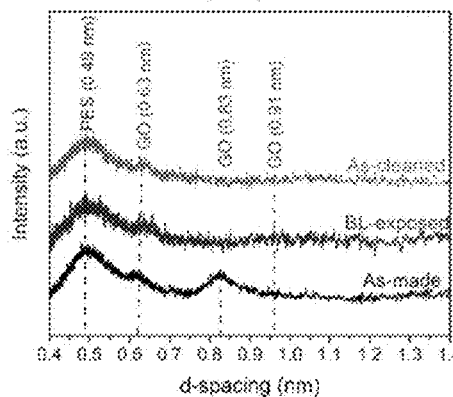
FIG. 9c is a graph indicating the XRD patterns of a graphene oxide membrane supported by a poly(ethersulfone) substrate when the graphene oxide membrane was exposed to 0.3 wt % black liquor at 70° C. for 3 days, in accordance with an example embodiment of the presently disclosed subject matter.
Figure 9D:
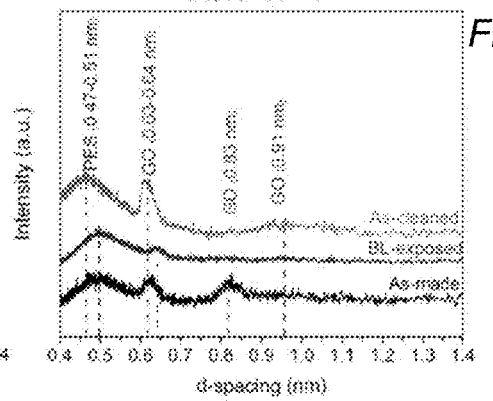
FIG. 9d is a graph indicating the XRD patterns of a graphene oxide membrane supported by a poly(ethersulfone) substrate when the graphene oxide membrane was exposed to 10 wt % black liquor at 20° C. for 3 days, in accordance with an example embodiment of the presently disclosed subject matter.
Figure 9E:
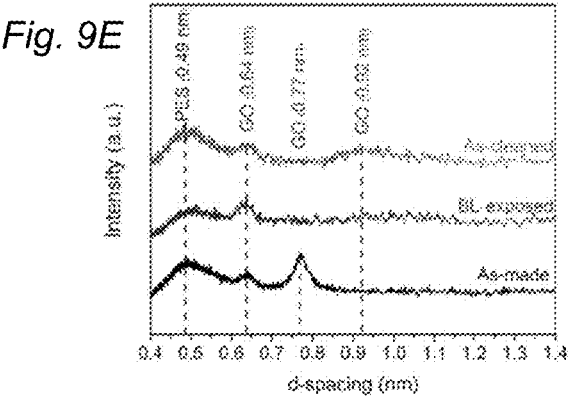
FIG. 9e is a graph indicating the XRD patterns of a graphene oxide membrane supported by a poly(ethersulfone) substrate when the graphene oxide membrane was exposed to 10 wt % black liquor at 70° C. for 4 days and at 85° C. for 3 days, in accordance with an example embodiment of the presently disclosed subject matter.

FIGS. 9a-9e shows the XRD patterns of the PES-supported graphene oxide membranes before and after black liquor (BL) exposure at different temperatures (20, 70, and 85° C.) and different black liquor concentrations (total solids=0.3 and 10 wt %), and also before and after cleaning the black liquor-exposed membranes. All the patterns show the broad peak characteristic of the PES support centered at a 2θ position of 18.5° and corresponding to a d-spacing of 0.49 nm (packing repeat distance of the glassy PES chains). The graphene oxide membranes show broad but well-defined peaks corresponding to the d-spacings between the oxidized sheets with sp$^3$ hybridization and also between pristine/partially oxidized sheets with mainly sp$^2$ hybridization. The broader XRD peaks of graphene oxide in comparison with the sharp peaks in graphite is because the layer oxidation (to form hydroxyl, carboxylic acid, and epoxide functional groups) is accompanied by stretching and disordering of the distance between the layers. The XRD patterns of all the dry as-made graphene oxide membranes in FIG. 7a-e present interlayer d-spacings in the regions of ~0.6 and ~0.8 nm. The former corresponds to pristine or partially oxidized regions, whereas the latter corresponds to fully $sp^3$ hybridized domains with a monolayer of water present between the sheets even in the "dried state" under ambient air. FIG. 9a shows that after soaking the graphene oxide membrane in water, the interlayer d-spacing of the oxidized regions swells to ~1.3 nm corresponding to three water layers, in good agreement with the behavior of previously reported graphene oxide laminates 15 prepared by vacuum filtration. In FIGS. 9b-9e, the XRD patterns of all the dried graphene oxide membranes after exposure to black liquor (regardless of the temperature and black liquor solids concentration) shows that the previous d-spacing of ~0.8 nm becomes very broad and is centered at a slightly larger d-spacing of ~0.9 nm. This indicates that exposure to black liquor has the effect of slightly swelling the interlayer spacing and reducing the registry between the oxidized layers. The swelling of the layers may be caused by the intercalation of low-MW lignin or other organic species between the layers. The functional d-spacing of ~0.9 nm in the graphene oxide graphene oxide membranes exposed to a black liquor environment is fully consistent with its high performance as a lignin-rejecting nanofiltration membrane and its MWCO of ~625 Da. Also, black liquor-exposed membranes after cleaning generally exhibit more well-defined XRD peaks than before cleaning, presumably due to the removal of surface foulants that reduce the XRD intensity from the graphene oxide membranes. However, the smaller interlayer d-spacing of ~0.6 nm is not affected by black liquor exposure as expected for pristine and hydrophobic graphene sheets. The interlayer d-spacing (~0.9 nm) of the functional graphene oxide membranes is consistent with the MWCO of ~625 Da, and the tested graphene oxide membranes are robust upon prolonged exposure to black liquor.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for processing black liquor comprising:
    removing from 90%-99% of lignin present in black liquor via filtering through a filtering membrane comprising:
        a substrate; and
        stacked non-crosslinked graphene oxide sheets forming a non-crosslinked graphene oxide membrane layer covering the substrate;
    wherein the black liquor has pre- and post-filtering properties including:
        a pre-filtering total solids concentration of 10 wt %, a temperature of between about 70° C. and about 95° C., and a pH of about 13; and
        a post-filtering temperature of between about 70° C. and about 95° C. and a pH of about 13; and
    wherein the graphene oxide membrane layer shields the substrate from exposure to the black liquor; and
    wherein permeability of the graphene oxide membrane layer as measured by water permeation flux as a function of transmembrane pressure does not decrease after flowing the black liquor through the filtering membrane.

2. The method of claim 1, wherein the lignin removed from the black liquor is between 95% and 99% of the lignin present in the pre-filtered black liquor.

3. The method of claim 1, wherein the substrate has a thermal stability limit greater than the temperature of the black liquor and comprises a microporous polymer substrate comprising a polymer with aryl groups.

4. The method of claim 1, wherein the substrate has a thermal stability limit greater than the temperature of the black liquor and comprises a macroporous polymer substrate comprising at least one of poly(sulfone) and poly(ethersulfone).

5. The method of claim 1, wherein the graphene oxide membrane layer has a thickness of less than about 300 nm.

6. The method of claim 1, wherein the substrate has a thermal stability limit greater than the temperature of the black liquor and comprises a microporous polymer substrate comprising a flat polymer sheet having a surface area greater than or equal to about 700 $cm^2$.

7. The method of claim 1, wherein the substrate has a thermal stability limit greater than the temperature of the black liquor and comprises a macroporous polymer substrate comprising flat polymer sheets,
    wherein each polymer sheet has a surface area greater than or equal to about 700 $cm^2$,
    wherein the filtering membrane comprises membrane sheets, each comprising a polymer sheet and the graphene oxide membrane layer, and
    wherein the membrane sheets are rolled around a core tube to form a spiral wound membrane module.

8. The method of claim 1, wherein the substrate has a thermal stability limit greater than the temperature of the black liquor and comprises a microporous polymer substrate comprising a hollow polymer tube having a surface area greater than or equal to about 100 $cm^2$.

9. The method of claim 1, wherein the substrate has a thermal stability limit greater than the temperature of the black liquor and comprises a macroporous polymer substrate comprising hollow polymer tubes,
    wherein each polymer tube has a surface area greater than or equal to about 100 $cm^2$,
    wherein the filtering membrane comprises membrane tubes, each comprising a hollow polymer tube and the graphene oxide membrane layer, and
    wherein the membrane tubes are combined to form a tubular membrane module.

10. The method of claim 1, wherein interlayer d-spacings of the stacked graphene oxide layers are in the range of about 3 angstroms to about 10 angstroms.

11. The method of claim 1, wherein the filtering membrane has a molecular weight cutoff in the range of about 300 Daltons to about 1000 Daltons.

12. A method of processing black liquor comprising:
filtering a stream of black liquor through a filtering membrane comprising:
  a polymer substrate; and
  stacked non-crosslinked graphene oxide sheets forming a non-crosslinked graphene oxide membrane layer covering the substrate;
wherein the black liquor has pre- and post-filtering properties including:
  a pre-filtering total solids concentration of 10 wt %, a temperature of between about 70° C. and about 95° C., and a pH of about 13; and
  a post-filtering temperature of between about 70° C. and about 95° C. and a pH of about 13;
wherein the black liquor comprises lignin;
wherein the filtering removes at least 90% of the lignin from the black liquor;
wherein the graphene oxide membrane layer shields the substrate from exposure to the black liquor;
wherein the filtering membrane is configured to have a permeate flux in a range from about 10 kg/h·m$^2$ to about 30 kg/h·m$^2$; and
wherein permeability of the graphene oxide membrane layer as measured by water permeation flux as a function of transmembrane pressure does not decrease after performing for at least four days filtering the lignin from the black liquor.

13. The method of claim 12, wherein the filtering membrane remains thermally and mechanically stable for at least 30 days filtering the lignin from the black liquor.

14. The method of claim 12, wherein the lignin removed from the black liquor is between 95% and 99% of the lignin present in the pre-filtered black liquor.

15. The method of claim 12, wherein the substrate is a sheet of microporous polymer substrate comprising a polymer with aryl groups having a surface area greater than or equal to about 700 cm$^2$; and
  wherein the graphene oxide membrane layer has a thickness of less than about 300 nm.

16. The method of claim 12, wherein the substrate is a sheet of macroporous polymer substrate comprising at least one of poly(sulfone) and poly(ethersulfone) having a surface area greater than or equal to about 700 cm$^2$; and
  wherein the graphene oxide membrane layer has a thickness of less than about 300 nm.

17. The method of claim 12, wherein the substrate is a macroporous polymer substrate comprising flat polymer sheets;
  wherein each polymer sheet has a surface area greater than or equal to about 700 cm$^2$;
  wherein the filtering membrane comprises membrane sheets, each comprising a polymer sheet and the graphene oxide membrane layer; and
  wherein the membrane sheets are rolled around a core tube to form a spiral wound membrane module.

18. The method of claim 12, wherein the substrate is a microporous polymer substrate comprising a hollow polymer tube or fiber having a surface area greater than or equal to about 100 cm$^2$.

19. The method of claim 12, wherein the substrate is a macroporous polymer substrate comprising hollow polymer tubes;
  wherein each polymer tube has a surface area greater than or equal to about 100 cm$^2$;
  wherein the filtering membrane comprises membrane sheets, each comprising a hollow polymer tube and the graphene oxide membrane layer; and
  wherein the polymer tubes are combined to form a tubular membrane module.

20. The method of claim 12, wherein interlayer d-spacings of the stacked graphene oxide layers are in the range of about 3 angstroms to about 10 angstroms; and
  wherein the filtering membrane has a molecular weight cutoff in the range of about 300 Daltons to about 1000 Daltons.

21. The method of claim 1, wherein the graphene oxide membrane layer remains thermally and mechanically stable under a surface flow velocity of the black liquor from about 0.22 to about 0.31 meters/second.

22. A method of processing black liquor comprising:
filtering a stream of black liquor comprising solids including lignin through a filtering membrane comprising a non-crosslinked graphene oxide membrane layer covering a substrate; and
removing at least 90% of the lignin from the black liquor;
wherein the black liquor has pre- and post-filtering properties including:
  a pre-filtering total solids concentration of 10 wt %, a temperature of between about 70° C. and about 95° C., and a pH of about 13; and
  a post-filtering temperature of between about 70° C. and about 95° C. and a pH of about 13:
wherein permeability of the graphene oxide membrane layer as measured by water permeation flux as a function of transmembrane pressure does not decrease after performing for at least four days filtering the lignin from the black liquor.

23. The method of claim 22, wherein the filtering membrane remains thermally and mechanically stable for at least 30 days filtering the lignin from the black liquor.

24. The method of claim 22, wherein the filtering removes at least 95% of the lignin when under from about 25 bar to about 30 bar of transmembrane pressure.

* * * * *